(12) United States Patent
Elangovan et al.

(10) Patent No.: US 10,407,023 B2
(45) Date of Patent: Sep. 10, 2019

(54) REMOTE STARTING OF ENGINES VIA VEHICLE KEYPADS

(71) Applicant: Ford Global Technologies, LLC, Dearborn, MI (US)

(72) Inventors: Vivekanandh Elangovan, Canton, MI (US); John Robert Van Wiemeersch, Novi, MI (US); Daniel M. King, Northville, MI (US); Timothy Thivierge, Jr., Carleton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/419,716

(22) Filed: Jan. 30, 2017

(65) Prior Publication Data

US 2018/0215345 A1    Aug. 2, 2018

(51) Int. Cl.
    *B60R 25/20*    (2013.01)
    *B60R 25/01*    (2013.01)
    *B60R 25/04*    (2013.01)
    *B60R 25/23*    (2013.01)
    *B60R 25/24*    (2013.01)

(52) U.S. Cl.
    CPC ............ *B60R 25/209* (2013.01); *B60R 25/01* (2013.01); *B60R 25/04* (2013.01); *B60R 25/23* (2013.01); *B60R 25/24* (2013.01); *B60R 2325/205* (2013.01)

(58) Field of Classification Search
    CPC . B60R 25/209; B60R 2325/205; B60R 25/24; B60R 25/23; B60R 25/04; B60R 25/01
    See application file for complete search history.

(56) References Cited

U.S. PATENT DOCUMENTS

| 7,248,151 | B2 | 7/2007 | McCall |
| 8,798,809 | B2 | 8/2014 | Kalhous et al. |
| 9,110,772 | B2 | 8/2015 | Huntzicker et al. |
| 2010/0073153 | A1* | 3/2010 | Yamaguchi ......... B60R 25/2036 340/426.17 |

(Continued)

FOREIGN PATENT DOCUMENTS

| CA | 2658963 A1 | 9/2010 |
| DE | 202016105621 U1 | 12/1916 |

OTHER PUBLICATIONS

Viper SmartStart Remote Start System, http://www.viper.com/smartstart/product/vss4x10/viper-smartstart-remote-start-system >.

(Continued)

*Primary Examiner* — Jerrah Edwards
*Assistant Examiner* — Mathew Franklin Gordon
(74) *Attorney, Agent, or Firm* — Frank Lollo; Neal, Gerber & Eisenberg LLP; James P. Muraff

(57) ABSTRACT

Method and apparatus are disclosed for remote starting of engines via vehicle keypads. An example vehicle includes a keypad, a communication module to communicate with a mobile device designated as a wireless key, and a vehicle activator. The vehicle activator is to remote start an engine in response to receiving a first code entered via the keypad when a battery of the mobile device is discharged and authorize control of the engine in response to the communication module establishing communication with the mobile device.

16 Claims, 4 Drawing Sheets

(56) References Cited

U.S. PATENT DOCUMENTS

| | | |
|---|---|---|
| 2010/0198428 A1 | 8/2010 | Sultan et al. |
| 2011/0215901 A1* | 9/2011 | Van Wiemeersch .... B60R 25/04 340/5.54 |
| 2014/0058586 A1 | 2/2014 | Kalhous et al. |
| 2014/0293753 A1 | 10/2014 | Pearson |
| 2015/0088339 A1* | 3/2015 | Fisher ...................... A61G 3/00 701/2 |
| 2015/0314750 A1 | 11/2015 | Van Wiemeersch et al. |
| 2016/0340940 A1 | 11/2016 | Krishnan |
| 2016/0347282 A1* | 12/2016 | Krishnan ................ B60R 25/23 |
| 2017/0251331 A1* | 8/2017 | Green .................. H04W 4/008 |
| 2017/0267213 A1* | 9/2017 | Berezin .................. B60K 35/00 |
| 2018/0154866 A1* | 6/2018 | Sute ........................ B60R 25/24 |

OTHER PUBLICATIONS

Seytek Mobilink 5000 Smartphone Integration Remote Start Car Alarm Keyless Entry System with Full Vehicle Tracking , https://www.amazon.com/Seytek-MobiLink-5000-Smartphone-Integration/dp/B00B4L2OB2 >.

Search Report dated Jul. 17, 2018 for GB Patent Application No. GB 1801443.1 (3 Pages).

* cited by examiner

REMOTE STARTING OF ENGINES VIA VEHICLE KEYPADS

TECHNICAL FIELD

The present disclosure generally relates to remote starting and, more specifically, to remote starting of engines via vehicle keypads.

BACKGROUND

Oftentimes, vehicles include remote keyless entry systems to enable a user (e.g., a driver, a passenger) to unlock and/or open a door without inserting a key into a lock. Some vehicles also include remote starting systems to enable a user to start an engine of the vehicle remotely without inserting the key into a vehicle ignition. In some instances, the remote keyless entry systems and/or the remote starting systems include a key fob that is carried by the user. In such instances, the key fob has a wireless transceiver that communicates with the vehicle to initiate the unlocking and/or opening of the door and/or the remote starting of the engine. In other instances, the remote keyless entry systems and/or the remote starting systems include an application operating on a mobile device that unlocks and/or opens the door and/or remote starts the engine of the vehicle (e.g., direct phone-to-vehicle communication, a telematics cellular-based system).

SUMMARY

The appended claims define this application. The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

Example embodiments are shown for remote starting of engines via vehicle keypads. An example disclosed vehicle includes a keypad, a communication module to communicate with a mobile device designated as a wireless key, and a vehicle activator. The vehicle activator is to remote start an engine in response to receiving a first code entered via the keypad when a battery of the mobile device is discharged and authorize control of the engine in response to the communication module establishing communication with the mobile device.

An example disclosed method for remote starting vehicles via vehicle keypads includes receiving a first code entered via a keypad of a vehicle when a battery of a mobile device designated as a wireless key is discharged, remote starting, via a processor, an engine in response to receiving the first code, and authorizing control of the engine in response to a communication module of the vehicle establishing communication with the mobile device.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

Figure 1:
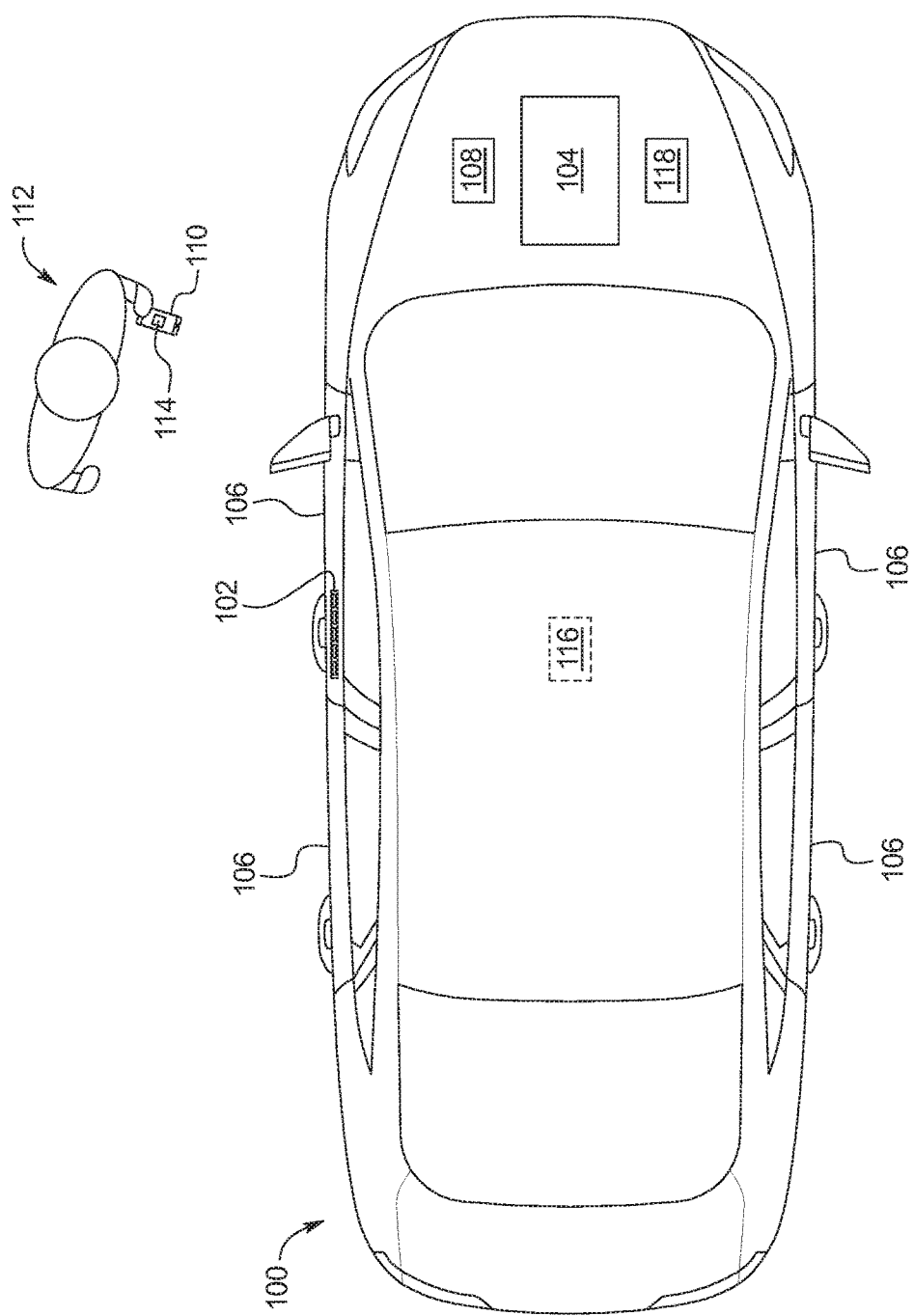
FIG. 1 illustrates an example vehicle including a keypad for remote starting an engine of the vehicle in accordance with the teachings herein.

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

Vehicles oftentimes include remote keyless entry systems to enable a user (e.g., a driver, a passenger) to unlock and/or open a door without inserting a key into a lock of the vehicle. Additionally, some vehicles include remote starting systems that enable a user to start an engine of the vehicle remotely without inserting the key into an ignition of the vehicle. In some instances, the remote keyless entry systems and/or the remote starting systems include a key fob that is carried by the user. In such instances, the key fob has a wireless transceiver that communicates with the vehicle to initiate the unlocking and/or opening of the door and/or the remote starting of the engine (e.g., via direct phone-to-vehicle communication, a telematics cellular-based system).

Further, some remote keyless entry systems and/or remote starting systems include an application operating on a mobile device (e.g., a smart phone) that unlocks and/or opens the door and/or remote starts the engine of the vehicle. In some instances, a battery of the mobile device may become discharged when the user is away from the vehicle. In such instances, the vehicle is unable to communicate with the mobile device having the discharged battery, thereby potentially preventing the user from unlocking and/or opening the door and/or remotely starting the engine as the user approaches the vehicle.

Example methods, apparatus, and computer readable media disclosed herein enable a user to remote start an engine of a vehicle via a keypad when a battery of a mobile device designated as a wireless key is discharged. Examples disclosed herein also enable the user to unlock and/or open one or more doors of the vehicle via the keypad when the battery of the mobile device is discharged. Further, some examples disclosed herein enable the user to initiate a charging station to recharge the battery of the mobile device. To prevent unauthorized operation of the vehicle, such examples authorize the user to control the engine when the battery of the mobile device is charged and the vehicle establishes communication with the mobile device.

Example vehicles disclosed herein include a keypad and a communication module. For example, the keypad is located on a vehicle door and/or any other exterior surface of the vehicle that is accessible to a user (e.g., a driver, a passenger). The communication module (e.g., a BLUETOOTH® wireless node) is to communicate with a mobile device (e.g., a smart phone, a smart watch, a wearable, a tablet, etc.) that is designated as a wireless key for the vehicle.

As used herein, a "wireless key" refers to a device that communicates with a vehicle to activate functions of the vehicle from a remote location away from the vehicle. An example wireless key includes a key fob and/or a mobile device having a wireless key application. For example, the wireless key communicates with the vehicle to enable keyless and/or passive entry of the vehicle, remote starting of an engine of the vehicle, etc. As used herein, "keyless entry" refers to utilization of a wireless key by a user to unlock and/or open a door without inserting a key into a corresponding lock of the door. As used herein, "passive entry" refers to utilization of a wireless key in which a door unlocks and/or opens upon detection that the wireless key is within proximity of the door. As used herein, "remote starting" refers to utilization of a wireless key to start an engine of a vehicle. In some examples, the engine of the vehicle starts upon detection that the wireless key is proximate to the vehicle.

Additionally, the example vehicles disclosed herein include a vehicle activator. For example, the vehicle activator is to remote start the engine via the mobile device when a battery of the mobile device is charged. When the battery of the mobile device is discharged, the vehicle activator is to remote start the engine of the vehicle in response to receiving a first code entered by the user via the keypad. As used herein, a "charged" battery of a device (e.g., a mobile device) refers to a battery in which at least a predetermined amount of energy is stored such that the battery is able to power the device. As used herein, a "discharged" battery of a device (e.g., a mobile device) refers to a battery in which less than a predetermined amount of energy is stored such that the battery is unable to power the device.

Further, the vehicle activator authorizes the user (e.g., the driver) to control the engine when the communication module establishes communication with the mobile device. The vehicle activator may prohibit control of the engine by the user when the communication module is unable to establish communication with the mobile device. For example, the communication module is unable to establish communication with the mobile device when the battery of the mobile device is discharged.

Some example vehicles disclosed herein include a charging station (e.g., located within a cabin of the vehicle at and/or near a center console) for recharging the mobile device. As used herein, a "charging station" refers to a structure that is to receive and connect to a battery of a mobile device to recharge the mobile device. As used herein, "recharging" refers to a process during which electric energy is supplied to a battery of a device (e.g., a mobile device). Further, in such examples, the communication module is able to establish communication with the mobile device to authorize the user to control the engine upon the recharging station recharging the battery of the mobile device. In some such examples, the vehicle activator activates the charging station when the keypad receives the first code entered by the user.

Additionally, in some examples, the vehicle activator unlocks one or more vehicle doors via the keypad when the battery of the mobile device is discharged. In some examples, the vehicle activator unlocks one or more of the vehicle doors upon receiving the first code that is entered via the keypad by the user. Additionally or alternatively, the vehicle activator unlocks one or more of the vehicle doors upon receiving a second code entered via the keypad by the user that is different than the first code. For example, the user may enter the first code before entering the second code via the keypad so that the vehicle activator remote starts the engine of the vehicle before unlocking one or more of the vehicle doors.

Turning to the figures, FIG. 1 illustrates an example vehicle 100 including a keypad 102 for remote starting an engine 104 of the vehicle 100 in accordance with the teachings herein. The vehicle 100 may be a standard gasoline powered vehicle, a hybrid vehicle, an electric vehicle, a fuel cell vehicle, and/or any other mobility implement type of vehicle. The vehicle 100 includes parts related to mobility, such as a powertrain with an engine, a transmission, a suspension, a driveshaft, and/or wheels, etc. The vehicle 100 may be non-autonomous, semi-autonomous (e.g., some routine motive functions controlled by the vehicle 100), or autonomous (e.g., motive functions are controlled by the vehicle 100 without direct driver input). As illustrated in FIG. 1, the vehicle 100 includes the keypad 102, the engine 104, doors 106, and a communication module 108.

In the illustrated example, the communication module 108 is to communicatively couple to a mobile device 110 (e.g., a smart phone, a smart watch, a wearable, a tablet, etc.) of a user 112 (e.g., an occupant, a driver, a passenger). The mobile device 110 is designated as a wireless key (e.g., by the user 112 and/or the vehicle 100) of a keyless entry system (e.g., a passive entry system) and/or a remote start system of the vehicle 100. In some examples, the communication module 108 is a short-range wireless module that includes a wireless transceiver to wirelessly communicate with the mobile device 110 and/or another device that is within a broadcast range or distance of the communication module 108. The short-range wireless module includes hardware and firmware to establish a connection with the mobile device 110. In some examples, the short-range wireless module includes one or more communication controllers for standards-based networks (e.g., Global System for Mobile Communications (GSM), Universal Mobile Telecommunications System (UMTS), Long Term Evolution (LTE), Code Division Multiple Access (CDMA), WiMAX (IEEE 802.16m), Near Field Communication (NFC), local area wireless network (including IEEE 802.11 a/b/g/n/ac or others), dedicated short range communication (DSRC), and Wireless Gigabit (IEEE 802.11ad), etc.). For example, the short-range wireless module implements the BLUETOOTH® protocol, the BLUETOOTH® Low Energy (BLE) protocol, a Wi-Fi®, and/or any other wireless communication protocol. The BLUETOOTH® and BLE protocols are set forth in Volume 6 of the BLUETOOTH® Specification 4.0 (and subsequent revisions) maintained by the BLUETOOTH® Special Interest Group. In the illustrated example, the vehicle 100 includes one communication module (e.g., the communication module 108). In other examples, the vehicle 100 may include a plurality of communication modules that are to communicate with the mobile device 110 and/or any other mobile device and are positioned at different locations throughout the vehicle 100.

When a battery 114 of the mobile device 110 is charged and the mobile device 110 is proximate to the vehicle 100, the mobile device 110 is able to collect a beacon (e.g., a low-energy beacon such as BLUETOOTH® low-energy (BLE) beacon) that is broadcasted intermittently by the communication module 108. Further, the communication module 108 is able to receive a return signal (e.g., a digital key, etc.) from the mobile device 110 when the mobile device 110 is proximate to the vehicle 100. The mobile device 110 sends the return signal to the communication module 108 of the vehicle 100 upon receiving the beacon to enable the vehicle 100 to authenticate the mobile device 110 for further communication with the vehicle 100. For example, upon being authenticated by the vehicle 100, the mobile device 110 may send a message to the vehicle 100 via the communication module 108 to remotely unlock and/or open one or more of the doors 106 and/or to remotely start the engine 104. In some examples, the user 112 presses a button on the mobile device 110 to initiate the mobile device 110 to send the message to the communication module 108 of the vehicle 100. In other examples, the vehicle 100 utilizes a passive entry system and/or a passive start system in which one or more of the doors 106 unlock and/or the engine 104 starts, respectively, upon the communication module 108 establishing communication with the mobile device 110. Further, in some examples, the user 112 is authorized to control the engine 104 upon the communication module 108 establishing communication with the mobile device 110. In such examples, the user 112 is prohibited from controlling the engine 104 when the communication module 108 is unable to establish communication with the mobile device 110.

When the battery 114 of the mobile device 110 is discharged, the mobile device 110 is unable to function as a wireless key for a remote entry system and/or a remote start system of the vehicle 100. The keypad 102 enables the user 112 to remote start the engine 104 and/or unlock one or more of the doors 106 when the battery 114 of the mobile device 110 is discharged and/or at any other time. For example, the user 112 enters a first password or code via buttons (e.g., buttons 302, 304, 306, 308, 310 of FIG. 3) of the keypad 102 to remote start the engine 104 and enters a second password or code via the buttons of the keypad 102 to unlock one or more of the doors 106. In other examples, the user 112 enters the first password or code to remote start the engine 104 and to unlock the one or more of the doors 106.

Further, as illustrated in FIG. 1, the vehicle 100 includes a charging station 116 and a vehicle activator 118. The charging station 116 recharges the battery 114 of the mobile device 110 when the battery is discharged and/or partially discharged. In some examples, the charging station 116 includes a power-data port (e.g., a universal serial bus (USB) port, a Lightning® port, a 12V power point, a wireless charging port, etc.) that is located at and/or near a center console of the vehicle 100. The vehicle activator 118 remote starts the engine 104 and/or unlocks one or more of the doors 106. For example, the vehicle activator 118 remote starts the engine 104 and/or unlocks one or more of the doors 106 in response to receiving a corresponding code that is entered (e.g., by the user 112) via the keypad 102. Additionally or alternatively, the vehicle activator 118 remote starts the engine 104 and/or unlocks one or more of the doors 106 in response to the communication module 108 receiving a message from the mobile device 110 to do so when the battery 114 of the mobile device 110 is charged.

In operation, the vehicle activator 118 remote starts the engine 104 and/or unlocks one or more of the doors 106. When the battery 114 of the mobile device 110 that is designated as a wireless key is charged, the vehicle activator 118 remote starts the engine 104 and/or unlocks one or more of the doors 106 when communication is established between the mobile device 110 and the communication module 108 of the vehicle 100. For example, the vehicle activator 118 remote starts the engine 104 upon receiving a first message from the mobile device 110 that instructs the vehicle activator 118 to do so and unlocks one or more of the doors 106 upon receiving a second message from the mobile device 110 that instructs the vehicle activator 118 to do so. Further, the vehicle activator 118 authorizes the user 112 to control the engine 104 upon the user 112 pressing a "start" button within the vehicle 100 and the communication module 108 subsequently confirming that communication is established with the mobile device 110.

When the mobile device 110 is unable to establish communication with the communication module 108 of the vehicle 100 (e.g., when the battery 114 is discharged) and/or at any other time, the vehicle activator 118 remote starts the engine 104 and/or opens one or more of the doors 106 in response to receiving a corresponding code via the keypad 102. For example, the vehicle activator 118 receives code upon the user 112 entering the code via the keypad 102.

For example, the vehicle activator 118 remote starts the engine 104 in response to receiving a first code entered via the keypad 102 and unlocks one or more of the doors 106 in response to receiving a second code entered via the keypad 102 that is different than the first code. In some examples, the user 112 may enter the first code before the second code via the keypad 102 to remote start the engine 104 before unlocking one or more of the doors 106 and/or may enter the second code before the first code via the keypad 102 to unlock one or more of the doors 106 before remote starting the engine 104. For example, if the user 112 enters the first code within a predetermined time period (e.g., 5 seconds) after entering the second code via the keypad 102, one or more of the doors 106 is unlocked and the engine 104 is remote started. In other examples, the vehicle activator 118 remote starts the engine 104 only when the doors 106 of the vehicle 100 are locked. In such examples, the user 112 is to enter the first code before entering the second code. If the vehicle activator 118 receives the second code to unlock one or more of the doors 106 before receiving the first code to remote start the engine 104, the vehicle activator 118 unlocks one or more of the doors 106 without remote starting the engine 104. In some such instances, the user 112 must relock the doors 106 and reenter the second code via the keypad 102 to remote starting the engine 104. In other examples, the vehicle activator 118 is to remote start the engine 104 after the doors 106 of the vehicle 100 are unlocked. In such examples, the user 112 is to enter the second code before entering the first code. In some such instances, the vehicle activator 118 may not remote start the engine 104 upon receiving the first code if the doors 106 are locked.

In some examples, the first code to remote start the engine 104 and the second code to unlock one or more of the doors 106 are each 5-character (e.g., 5-digit) codes. In other examples, the first code and/or the second code include more or less characters. For example, if the first code to remote start the engine 104 is to be entered before the second code to unlock one or more of the doors 106, the second code may include less characters (e.g., a 1- or 2-character code) than that of the first code (e.g., a 5-character code) so that the first and second codes can be entered quickly in sequence.

Further, in other examples, the vehicle activator 118 remote starts the engine 104 and unlocks one or more of the doors 106 in response to receiving the first code via the keypad 102. That is, in such examples, the user 112 enters a single code (i.e., the first code) via the keypad 102 to instruct the vehicle activator 118 to both remote start the engine 104 and unlock one or more of the doors 106.

Additionally, in some examples, the vehicle activator 118 is in a non-motive start mode to prohibit control of the engine 104 by the user 112 when the communication module 108 of the vehicle 100 is unable to establish communication with the mobile device 110 designated as the wireless key. For example, the vehicle activator 118 enters a motive mode in which the user 112 is authorized to control the engine 104 of the vehicle 100 in response to the user 112 pressing the "start" button and the communication module 108 confirming that communication is established with the mobile device 110. That is, the vehicle activator 118 prevents the user 112 from controlling the engine 104 that is remote started via the keypad 102 and the vehicle activator 118 when the communication module 108 is unable to establish communication with the mobile device 110 due to the battery 114 being discharged.

In examples in which the user 112 enters the vehicle 100 via the keypad 102 when the battery 114 of the mobile device 110 is discharged, the user 112 is to connect the mobile device 110 to the charging station 116 of the vehicle 100. For example, the vehicle activator 118 activates the charging station 116 upon receiving a code (e.g., the first code) to remote start the engine 1054. When the charging station 116 charges the battery 114 of the mobile device 110 to a predetermined threshold, the communication module 108 establishes communication with the mobile device 110. In turn, the vehicle activator 118 authorizes the user 112 to control the engine 104 of the vehicle 100. That is, when the battery 114 of the mobile device 110 is discharged and the engine 104 is remote started via the keypad 102, the charging station 116 is to recharge the battery 114 until the communication module 108 establishes communication with the mobile device 110 to enable the user 112 to drive the vehicle 100. Additionally or alternatively, in examples in which the user 112 enters the second code to unlock one or more of the doors 106, the user 112 may remote start the engine 104 and/or activate the charging station 116 (e.g., for a 5-minute duration) via a center console touch screen that is activated when the second code is entered. In some such examples, the user 112 remote starts the engine 104 via the center console touch screen to extend a duration (e.g., a 15-minute duration) that the charging station 116 is activated. After the activation duration of the charging station 116 has ended, the vehicle activator 118 may send a signal to warn the user 112 (e.g., an audible warning via a horn, a visual warning via flashing of lights, etc.) that the activation duration of the charging station 116 has ended. Further, in some examples, the user 112 enters a code (e.g., a third code) via the keypad 102 to activate the charging station 116 for a predetermined duration (e.g., a 5-minute duration). If the communication module 108 of the vehicle 100 is unable to establish communication with the mobile device 110, the charging station 116 is activated for an extended duration (e.g., a 15-minute duration, a 20-minute duration, etc.).

Figure 2:
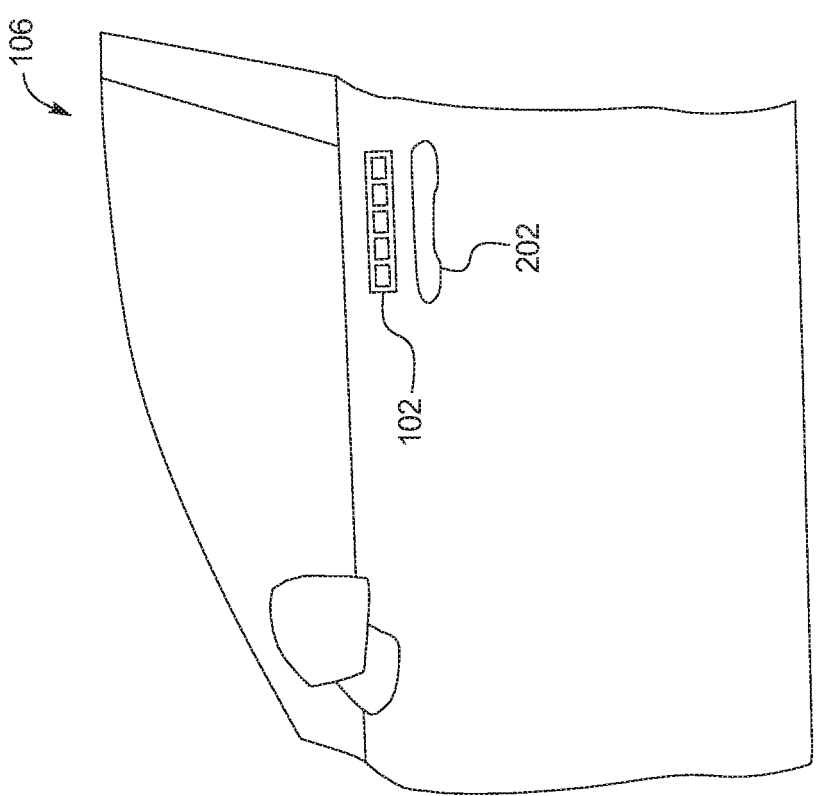
FIG. 2 illustrates the keypad of FIG. 1 located on a door of the vehicle of FIG. 1.

FIG. 2 illustrates the keypad 102 located on one of the doors 106 of the vehicle 100. In the illustrated example, the door 106 on which the keypad 102 is located is a front, driver-side door of the vehicle 100. The keypad 102 is located adjacent to and above a door handle 202 that facilitates opening and closing of the door 106. In other examples, the keypad 102 is in a different position on the door 106 relative to the door handle 202 is different (e.g., to the right of, to the left of, below, etc.).

Additionally or alternatively, the keypad 102 may be located on any other of the doors 106 (e.g., a front, passenger-side door; a rear, driver-side door; a rear, passenger-side door, etc.) of the vehicle 100. In other examples, the keypad 102 may be located on another external surface of the vehicle 100 (e.g., on a hood, along a pillar, on a windshield, etc.) and/or under a fuel or electric vehicle (EV) cable door.

Alternatively, the keypad 102 may be a virtual keypad projected onto a surface of the vehicle 100 (e.g., a digital keypad projected onto a window of the front, driver-side door). Further, the vehicle 100 may include a plurality of keypads that are located at different positions on the exterior surface of the vehicle 100. For example, the keypad 102 may be located on one of the doors 106 of the vehicle 100, and another keypad may be located on another of the doors 106 and/or on the windshield of the vehicle 100.

Figure 3:
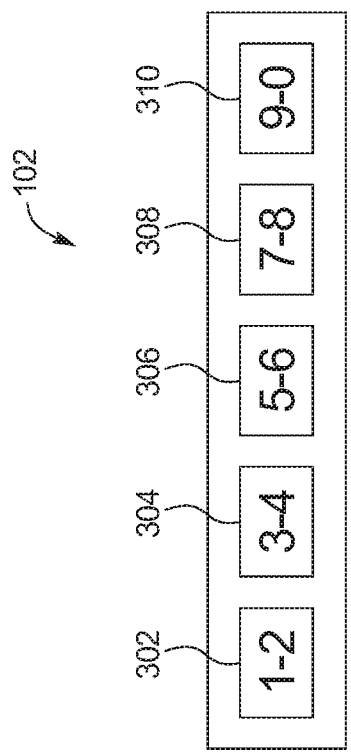
FIG. 3 further illustrates the keypad of FIG. 1.

FIG. 3 further illustrates the keypad 102. In the illustrated example, the keypad 102 includes five buttons 302, 304, 306, 308, 310 that enable the user 112 to enter a code. In other examples, the keypad 102 may include more or less buttons. In the illustrated example, each of the buttons 302, 304, 306, 308, 310 includes a label with numeric characters to facilitate the user 112 in entering a code via the keypad 102. As illustrated in FIG. 3, the first button 302 is labeled "1-2," the second button 304 is labeled "3-4," the third button 306 is labeled "5-6," the fourth button 308 is labeled "7-8," and the fifth button 310 is labeled "9-0." For example, if the code to remote start the engine 104 is "86753", the user 112 presses the fourth button 308, the third button 306, the fourth button 308, the third button 306, and the second button 304 in succession to remote start the engine 104. If the code to unlock one or more of the doors 106 is "09", the user 112 may press the fifth button 310 twice in succession to unlock the one or more of the doors 106. In other examples, the label of each of the buttons 302, 304, 306, 308, 310 may include any other type of characters (e.g., alphabetic, alphanumeric, etc.) that facilitate the user 112 in entering a code via the keypad 102.

Figure 4:
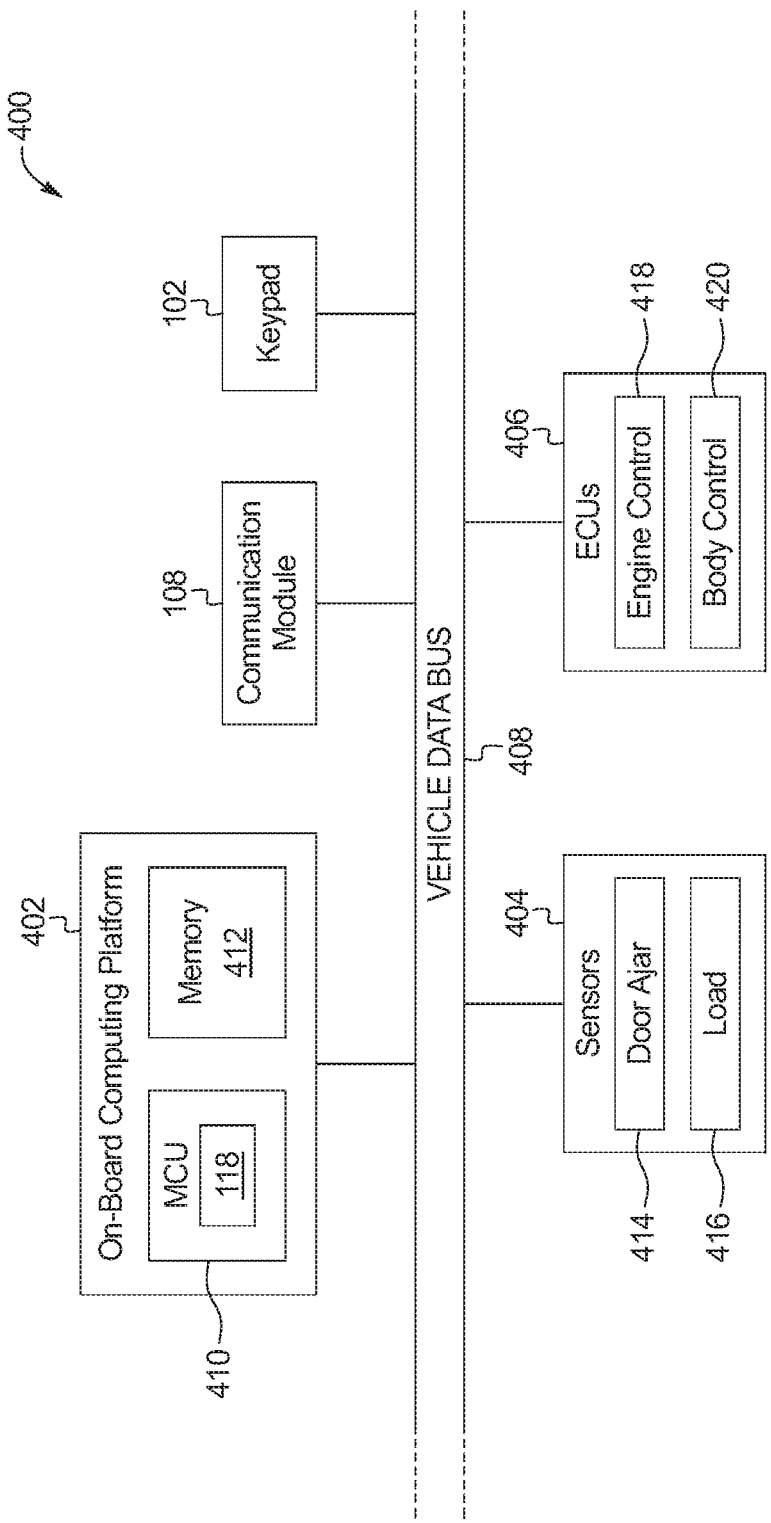
FIG. 4 is a block diagram of electronic components of the vehicle of FIG. 1.

FIG. 4 is a block diagram of electronic components 400 of the vehicle 100. As illustrated in FIG. 4, the electronic components 400 include an on-board computing platform 402, the communication module 108, the keypad 102, sensors 404, electronic control units (ECUs) 406, and a vehicle data bus 408.

The on-board computing platform 402 includes a microcontroller unit, controller or processor 410 and memory 412. In some examples, the processor 410 of the on-board computing platform 402 is structured to include the vehicle activator 118. Alternatively, in some examples, the vehicle activator 118 is incorporated into another ECU (e.g., a body control module, an engine control unit, etc.) with its own processor 410 and memory 412. The processor 410 may be any suitable processing device or set of processing devices such as, but not limited to, a microprocessor, a microcontroller-based platform, an integrated circuit, one or more field programmable gate arrays (FPGAs), and/or one or more application-specific integrated circuits (ASICs). The memory 412 may be volatile memory (e.g., RAM including non-volatile RAM, magnetic RAM, ferroelectric RAM, etc.), non-volatile memory (e.g., disk memory, FLASH memory, EPROMs, EEPROMs, memristor-based non-volatile solid-state memory, etc.), unalterable memory (e.g., EPROMs), read-only memory, and/or high-capacity storage devices (e.g., hard drives, solid state drives, etc). In some examples, the memory 412 includes multiple kinds of memory, particularly volatile memory and non-volatile memory.

The memory 412 is computer readable media on which one or more sets of instructions, such as the software for operating the methods of the present disclosure, can be embedded. The instructions may embody one or more of the methods or logic as described herein. For example, the instructions reside completely, or at least partially, within any one or more of the memory 412, the computer readable medium, and/or within the processor 410 during execution of the instructions.

The terms "non-transitory computer-readable medium" and "computer-readable medium" include a single medium or multiple media, such as a centralized or distributed database, and/or associated caches and servers that store one or more sets of instructions. Further, the terms "non-transitory computer-readable medium" and "computer-readable medium" include any tangible medium that is capable of storing, encoding or carrying a set of instructions for execution by a processor or that cause a system to perform any one or more of the methods or operations disclosed herein. As used herein, the term "computer readable medium" is expressly defined to include any type of computer readable storage device and/or storage disk and to exclude propagating signals.

The sensors 404 are arranged in and around the vehicle 100 to monitor properties of the vehicle 100 and/or an environment in which the vehicle 100 is located. One or more of the sensors 404 may be mounted to measure properties around an exterior of the vehicle 100. Additionally or alternatively, one or more of the sensors 404 may be mounted inside a cabin of the vehicle 100 or in a body of the vehicle 100 (e.g., an engine compartment, wheel wells, etc.) to measure properties in an interior of the vehicle 100. For example, the sensors 404 include accelerometers, odometers, tachometers, pitch and yaw sensors, wheel speed sensors, microphones, tire pressure sensors, biometric sensors and/or sensors of any other suitable type. In the illustrated example, the sensors 404 include a door-ajar sensor 414 and a load sensor 416 (e.g., a seat-pressure sensor). For example, the door-ajar sensor 414 detects when one or more of the doors 106 is opened, and the load sensor 416 is positioned within and/or under a driver seat of the vehicle 100 to detect when a driver (e.g., the user 112) is present in the vehicle 100. In some examples, the vehicle activator 118 may prevent the engine 104 from being controlled by the user 112 in response to the door-ajar sensor 414 detecting that one or more of the doors 106 is ajar and/or the load sensor 416 detecting that the user 112 is not seated on the driver seat of the vehicle 100.

The ECUs 406 monitor and control the subsystems of the vehicle 100. For example, the ECUs 406 are discrete sets of electronics that include their own circuit(s) (e.g., integrated circuits, microprocessors, memory, storage, etc.) and firmware, sensors, actuators, and/or mounting hardware. The ECUs 406 communicate and exchange information via a vehicle data bus (e.g., the vehicle data bus 408). Additionally, the ECUs 406 may communicate properties (e.g., status of the ECUs 406, sensor readings, control state, error and diagnostic codes, etc.) to and/or receive requests from each other. For example, the vehicle 100 may have seventy or more of the ECUs 406 that are positioned in various locations around the vehicle 100 and are communicatively coupled by the vehicle data bus 408. In the illustrated example, the ECUs 406 include an engine control unit 418 and a body control module 420. The engine control unit 418 controls operation (e.g., remote starting) of the engine 104 of the vehicle 100. Further, the body control module 420 controls one or more subsystems throughout the vehicle 100, such as power windows, power locks, an immobilizer system, power mirrors, etc. For example, the body control module 420 includes circuits that drive one or more of relays (e.g., to control wiper fluid, etc.), brushed direct current (DC) motors (e.g., to control power seats, power locks, power windows, wipers, etc.), stepper motors, LEDs, etc. In some examples, the engine control unit 418 and the body control module 420 receive a signal to remote start the engine 104 and unlock one or more of the doors 106, respectively.

The vehicle data bus 408 communicatively couples the keypad 102, the communication module 108, the on-board computing platform 402, the sensors 404, and the ECUs 406. In some examples, the vehicle data bus 408 includes one or more data buses. The vehicle data bus 408 may be implemented in accordance with a controller area network (CAN) bus protocol as defined by International Standards Organization (ISO) 11898-1, a Media Oriented Systems Transport (MOST) bus protocol, a CAN flexible data (CAN-FD) bus protocol (ISO 11898-7) and/a K-line bus protocol (ISO 9141 and ISO 14230-1), and/or an Ethernet™ bus protocol IEEE 802.3 (2002 onwards), etc.

Figure 5:
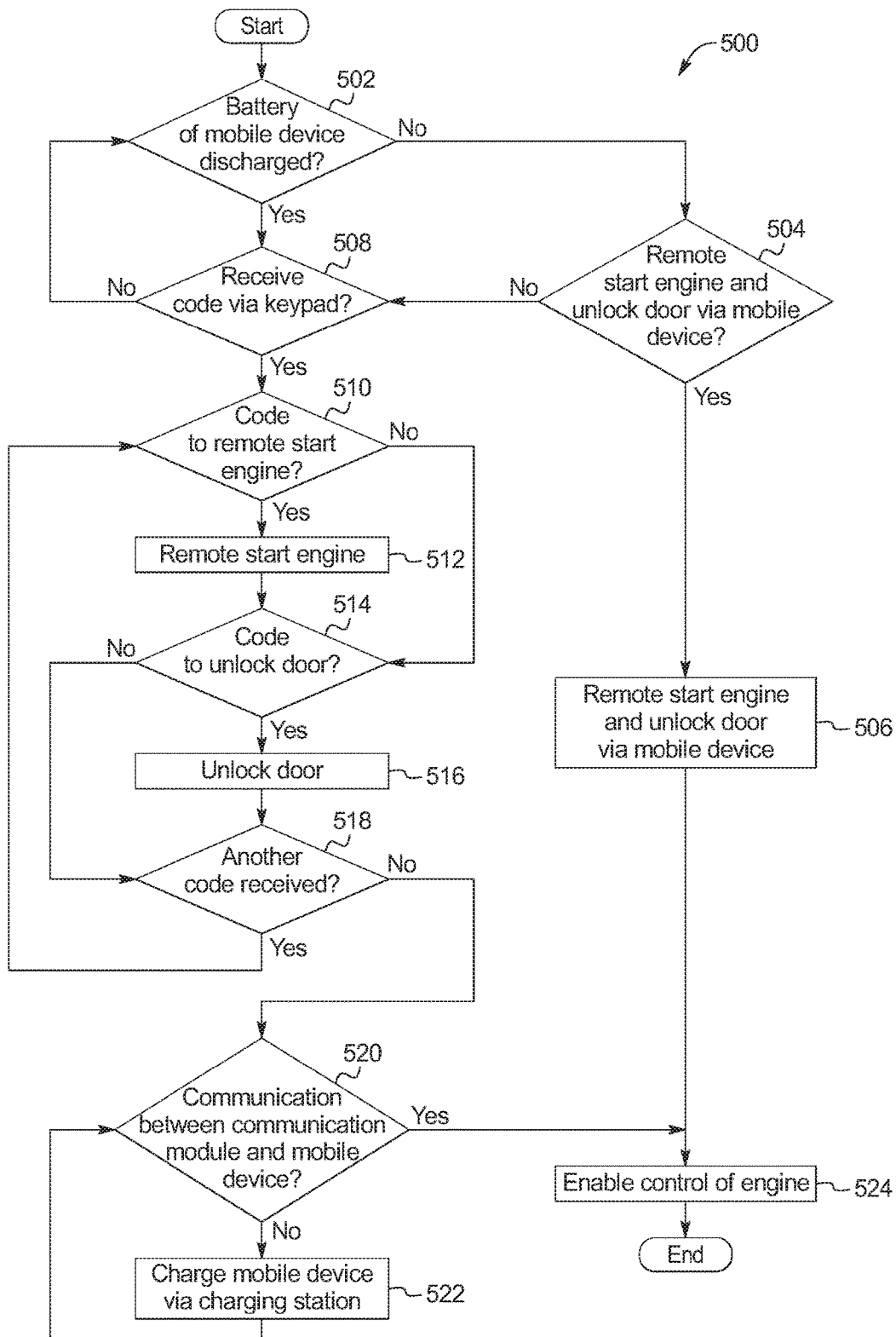
FIG. 5 is a flowchart of an example method for remote starting the engine of the vehicle via the keypad of FIG. 1.

FIG. 5 is a flowchart of an example method 500 to remote starting an engine of a vehicle via a keypad of the vehicle. The flowchart of FIG. 5 is representative of machine readable instructions that are stored in memory (such as the memory 412 of FIG. 4) and include one or more programs which, when executed by a processor (such as the processor 410 of FIG. 4), cause the vehicle 100 to implement the example the vehicle activator 118 of FIGS. 1 and 4. While the example program is described with reference to the flowchart illustrated in FIG. 5, many other methods of implementing the example vehicle activator 118 may alternatively be used. For example, the order of execution of the blocks may be rearranged, changed, eliminated, and/or combined to perform the method 500. Further, because the method 500 is disclosed in connection with the components of FIGS. 1-4, some functions of those components will not be described in detail below.

Initially, at block 502, the vehicle activator 118 determines whether the battery 114 of the mobile device 110 of the user 112 is discharged. For example, the vehicle activator 118 determiners whether the battery 114 is discharged by determining whether the communication module 108 of the vehicle 100 has established communication with the mobile device 110. The vehicle activator 118 determines that the battery 114 is discharged when the mobile device is within the range of the communication module 108 and communication between the mobile device 110 and the communication module 108 is unable to be established. Further, the vehicle activator 118 determines that the battery 114 is not discharged (e.g., charged or partially charged) when communication is established between the mobile device 110 and the communication module 108.

At block 504, in response to determining that the battery 114 of the mobile device 110 is not discharged, the vehicle activator 118 determines whether the engine 104 is to be remote started and/or one or more of the doors 106 is to be unlocked via the mobile device 110. For example, the vehicle activator 118 is to remote start the engine 104 and/or unlock one or more of the doors 106 upon the communication module 108 receiving a corresponding message from the mobile device 110 to do so. At block 506, in response to determining that the engine 104 is to be remote started and/or one or more of the doors 106 is to be unlocked via the mobile device 110, the vehicle activator 118 remote starts the engine 104 and/or unlocks one or more of the doors 106. For example, the vehicle activator 118 remote starts the engine 104 in response to the communication module 108 receiving a message from the mobile device 110 instructing the vehicle activator 118 to do so and unlocks one or more of the doors 106 in response to the communication module 108 receiving another message from the mobile device 110 instructing the vehicle activator 118 to do so.

Otherwise, upon determining at block 502 that the battery 114 of the mobile device 110 is discharged or upon determining at block 504 that the engine 104 is not to be remote started and/or one or more of the doors 106 is not to be unlocked via the mobile device 110, the vehicle activator 118 determines whether a code has been received via the keypad 102 (block 508). In response to determining that a code has not been received, the method 500 returns to block 502. Otherwise, in response to determining that a code (e.g., a first code) has been received, the method 500 proceeds to block 510.

At block 510, the vehicle activator 118 determines whether the code received via the keypad 102 is associated with remote starting the engine 104. In response to determining that the code is to remote start the engine 104, the method 500 proceeds to block 512 at which the vehicle activator 118 remote starts the engine 104. In some examples, the vehicle activator 118 activates the charging station 116 to enable the user to recharge the battery 114 of the mobile device 110 upon entering the vehicle 100. Otherwise, in response to determining that the code is not associated with remote starting the engine 104, the method 500 proceeds to block 514 at which the vehicle activator 118 determines whether the code received via the keypad 102 is associated with opening one or more of the doors 106 of the vehicle 100. In response to determining that the code is to unlock one or more of the doors 106, the method 500 proceeds to block 516 at which the vehicle activator 118 unlocks one or more of the doors 106. Otherwise, in response to determining that the code is not associated with unlocking one or more of the doors 106, the method 500 proceeds to block 518 at which the vehicle activator 118 determines whether another code (e.g., a second code) has been received via the keypad 102. In response to determining that another code has been received via the keypad 102, the method 500 repeats blocks 510, 512, 514, 516, 518 for the other code. Otherwise, in response to determining that another code has not been received via the keypad 102, the method proceeds to block 520.

At block 520, the vehicle activator 118 determines whether communication has been established between the communication module 108 and the mobile device 110. For example, vehicle activator 118 determines whether communication has been established between the communication module 108 and the mobile device 110 upon the user 112 pressing a "start" button located within the vehicle 100. In response to determining that the communication has not been established (e.g., because the battery 114 of the mobile device 110 remains discharged), the charging station 116 of the vehicle 100 recharged the battery 114 of the mobile device 110 upon the user 112 connecting the mobile device 110 to the charging station 116 (block 522). Upon charging the mobile device 110 via the charging station 116, the method returns to block 520. For example, the charging station 116 continues to recharge the battery 114 of the mobile device 110 until the battery 114 is charged to a predetermined level that enables the mobile device 110 to establish communication with the communication module 108 of the vehicle 100. At block 524, upon communication being established at block 520 or upon remote starting the engine 104 at block 506, the vehicle activator 118 enables the user 112 to control the engine 104 of the vehicle 100. For example, the vehicle activator 118 enables the user 112 to control the engine 104 upon the user 112 pressing the "start" button within vehicle 100 and the communication module 108 being communicatively coupled to the mobile device 110.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". The terms "includes," "including," and "include" are inclusive and have the same scope as "comprises," "comprising," and "comprise" respectively.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

What is claimed is:

1. A vehicle comprising:
a keypad;
a communication module;
a charging station for recharging a mobile device; and
a controller to:
remote start an engine responsive to:
the communication module being unable to communicate with the mobile device designated as a wireless key due to the mobile device being discharged; and
the keypad receiving a first code;
activate the charging station in response to receiving the first code entered via the keypad; and
authorize control of the engine responsive to the communication module establishing communication with the mobile device upon the mobile device being recharged.

2. The vehicle of claim 1, wherein the keypad is located on an exterior surface of the vehicle.

3. The vehicle of claim 1, wherein, when the communication module is unable to communicate with the mobile device due to the mobile device being discharged, the controller is to unlock a vehicle door based on the keypad.

4. The vehicle of claim 3, wherein the controller is to unlock the vehicle door in response to receiving the first code entered via the keypad.

5. The vehicle of claim 3, wherein the controller is to unlock the vehicle door in response to receiving a second code entered via the keypad, the second code being different than the first code.

6. The vehicle of claim 5, wherein the controller is to remote start the engine before unlocking the vehicle door.

7. The vehicle of claim 1, wherein the controller is to remote start the engine in response to the communication module receiving a remote start message from the mobile device when the communication module is in communication with the mobile device.

8. The vehicle of claim 1, the controller is to prohibit control of the engine in response to the communication module being unable to communicate with the mobile device due to the mobile device being discharged.

9. The vehicle of claim 1, wherein the communication module is to establish communication with the mobile device after the charging station has recharged the mobile device to a predetermined level.

10. The vehicle of claim 1, wherein the controller is to authorize control of the engine in response to a start button within the vehicle being pressed by a user when the communication module is in communication with the mobile device.

11. The vehicle of claim 5, wherein the controller is to prohibit remote starting of the engine when the vehicle door is unlocked.

12. The vehicle of claim 5, wherein the controller is to remote start the engine and unlock the vehicle door in response to the keypad receiving the first code before receiving the second code.

13. The vehicle of claim 1, wherein the controller is to activate the charging station for a predetermined activation duration upon receiving the first code.

14. A method comprising:
   receiving a first code via a keypad of a vehicle;
   remote starting, via a processor, an engine responsive to receiving the first code when a communication module of the vehicle is unable to communicate with a mobile device designated as a wireless key due to the mobile device being discharged;
   activating a charging station of a vehicle in response to receiving the first code entered via the keypad;
   recharging the mobile device via the charging station; and
   establishing communication between the communication module and the mobile device upon the charging station recharging the mobile device to a predetermined level; and
   authorizing control of the engine responsive to the communication module establishing communication with the mobile device.

15. The method of claim 14, further including unlocking a door of the vehicle via the keypad when the communication module is unable to communicate with the mobile device due to the mobile device being discharged.

16. The method of claim 14, further including prohibiting control of the engine when the communication module is unable to establish communication with the mobile device due to the mobile device being discharged.

* * * * *